UNITED STATES PATENT OFFICE.

THOMAS HENRY PALMER, OF MELBOURNE, VICTORIA, AND HARRY VERNON SEALE AND RALPH DOWLING NEVETT, OF BROKEN HILL, NEW SOUTH WALES, AUSTRALIA.

FLOTATION SEPARATION OF MINERAL SUBSTANCES.

1,401,435. Specification of Letters Patent. Patented Dec. 27, 1921.

No Drawing. Application filed September 2, 1919. Serial No. 321,139.

*To all whom it may concern:*

Be it known that we, THOMAS HENRY PALMER, of 360 Collins street, Melbourne, Victoria, Australia, mining engineer, and HARRY VERNON SEALE and RALPH DOWLING NEVETT, metallurgists, both of Junction North Mine, Broken Hill, New South Wales, Australia, subjects of the King of Great Britain and Ireland, have invented certain new and useful Improvements in Flotation Separation of Mineral Substances, of which the following is a specification.

This invention relates to the separation of metallic sulfids and certain other metalliferous substances from ores, concentrates, slimes, and/or—tailings, either in fresh or weather condition (hereinafter termed "ore" or "ores") with the object of obtaining the values therefrom either as a mixed or collective float or as separate floats successively, that is as preferential or differential floats.

The existing state of knowledge in the art of flotation suffices to suggest in the case of any particular ore, whether that ore is one which may be treated by flotation methods. Such ores comprise notably mixed sulfid ores, and sulfid ores containing oxidized particles or portions. As is well known, certain ores which in their natural condition are not amenable to flotation, are in certain cases rendered susceptible to flotation treatment by sulfidization.

The invention consists in submitting the ore to flotation treatment after addition of elemental sulfur. The flotation liquor may be either acid, neutral or alkaline, and the operation may be conducted either with or without organic frothing agents. A limited proportion only of sulfur is required; it may be contained in the flotation liquor or water in a condition of solution, or it may be contained therein in a condition of mechanical intermixture; and it may be introduced into the pulp before the pulp is brought into the flotation apparatus, or it may be introduced into the water with which the ore or pulp is mixed, or into the flotation bath, or into the circuit liquor. The essential feature is the addition of sulfur in elemental condition, and not necessarily in excess of a limited proportion, associated with the material undergoing separation treatment by flotation. Excess of sulfur is wasteful and does not exalt the effect procured by a limited proportion of sulfur.

We distinguish between sulfur in elemental condition and sulfur in chemical combination with other elements, and the term "elemental sulfur" in the claims of this specification is to be construed subject to this definition. For the purposes of our process the introduction of sulfur into the mass under treatment in elemental condition preferably in solution, is relied on.

The addition of elemental sulfur to a flotation mass exalts the tendency of sulfids and certain other metalliferous substances to separate from each other and from gangue when the mass is submitted to flotation treatment. In an ore containing mixed sulfids, it procures augmented differentiation in the floatable qualities of the several sulfids contained in it. Thus in the case of an ore containing sulfids of iron, lead, and zinc, it has the effect of increasing the floatable properties of galena and/or pyrite in preference to blende, or causing the blende to become temporarily less susceptible to flotation. Whether differentiation as between lead sulfid and the other contents of the ore results from an exaltation of the floatable character of the lead sulfid consequent upon the addition of elemental sulfur; or whether it is the result of a repellent effect produced by such sulfur as between the lead sulfid on the one hand and the other contents of the ore, or some of them, on the other hand; or whether it operates to suppress floatable qualities in some or all of the ore contents other than a particular sulfid, is immaterial for our purposes. The fact we have established is that an exaltation of the flotative qualities of sulfids in a mixed sulfid ore is procured by introducing elemental sulfur into the mass under treatment.

Elemental sulfur thus produces a distinct effect in facilitating the separation from ores of sulfids and other metalliferous substances which are amenable to flotation, and for endowing one class of sulfids with relatively better floatable quality than another, when said sulfur is added in a low proportion ranging up to say, 10-lbs. per ton of ore, but we do not limit ourselves to this proportion as a maximum though our practice has proven that the addition of any higher proportion of sulfur is unnecessary and wasteful. For every ore the most desirable proportion of sulfur to ore, having regard to efficiency and economy, must be ascertained by appropriate laboratory or plant test; a definite rule for assuring the best effects cannot be stated regardless of the nature and physical characteristics of the particular ore to be treated.

We have also found that by the addition of elemental sulfur, either with or without acid, weathered ores are caused to recover the differential flotation properties peculiar to them when they are in fresh condition. As is well known, weathered ores are usually less readily separable by flotation methods for the recovery of values therefrom than are fresh ores.

We have also found that the addition of elemental sulfur accelerates the action of sulfureted hydrogen and other sulfidizing agents in sulfidization and resulfidization and in flotation of oxidized ores.

It is not conceived that the potency of elemental sulfur thus used in flotation treatment of ores is dependent on agitation or aeration of the mass in which it is contained, or upon the evolution of gas in the mass, but as in practice agitation is necessarily incident to aeration, and as aeration or gasification, whether accidental or forced, is generally incidental to flotation processes in common use, specific instances of the application of our invention have been described herein in connection with processes in which pulp is aerated and agitated during flotation of sulfid minerals therefrom.

We have frequently observed that in the operation of our process the presence of oil or other frothing agents in any considerable quantities militates against the differentiation otherwise procurable as between certain metalliferous substances, as for instance lead sulfids and zinc sulfids. That is to say, that where a certain differentiation is obtained by our methods, using no oil or other frothing agent, or only a limited proportion of frothing agent, an inferior differentiation as between, for instance, lead sulfid and zinc sulfid is obtained when the proportion of oil or other frothing agent is substantially increased.

We have made the same observation in connection with increase of acidity and increase of temperature; the maximum differentiation appears to be obtained so that a preferential float can be obtained low in the secondary products, when the temperature is normal or low and acid and frothing agents are absent or present only in small proportions.

When acid is used the extent and manner of the use of it is prescribed according to experience with known processes in commercial use. We have observed, however, that when sulfur is added a smaller proportion of acid is required to produce like results than would be otherwise necessary.

Similarly when frothing agents are used, the extent and manner of their use is prescribed by known experience; subject always, however, to the reservation that differentiation is diminished when the proportion of acid or frothing agent is increased, as has been already explained.

Elemental sulfur may be brought into solution by many methods. It is well known that sulfur is more or less soluble in essential oils, tar, and tar oils. A convenient and efficacious method consists in boiling powdered sulfur in a weak aqueous solution of acid, preferably sulfuric acid, with a small amount of coal tar.

After one value, for instance lead sulfid, has been substantially separated from an ore by flotation treatment, the ore remainders are retreated, successively if necessary, for the separation therefrom of other values, as for instance, zinc sulfid. The re-treatment is effected in most cases in the same liquor as the first treatment, and the raising of the second and subsequent floats is procured by increasing the temperature of the mass and/or by modifying the physical or chemical characteristics of the liquor according to known practice.

By way of practical explanation of the operation of our process, the following representative instances of treatment of various mixed sulfid ores are cited:—

(1) One pound of a Broken Hill weathered slime, four pounds of water, 15-cc. of sulfur solution (containing an equivalent of 1.2-lbs. of sulfur per ton of slime) and a quantity of sulfuric acid (equivalent to 8-lbs. per ton of slime), were subjected to agitation/aeration at a temperature of 130° F., producing a mixed float which assayed 26.3% lead, 34.8% zinc and 20.1-ozs. of silver per ton. The residue assayed 4.5% lead (of which 3.8% was oxidized), 2.9% zinc (of which 0.8% was oxidized) and 2.1-ozs. of silver per ton.

It will be noted that this test treatment was conducted with acid. It is not, however, essential that the treatment of weathered ore should be conducted with acid, though we have found it preferable to use acid in the treatment of weathered ores.

(2) One pound of fresh slime of a Broken Hill sulfid ore, four pounds of water, three grains of elemental sulfur in powder form, and two drops of coal tar, were subjected to agitation/aeration producing a float which assayed 74.6% lead, 5.6% zinc and 46.8-ozs. of silver per ton. The remainder was heated to 140° F., and four drops of eucalyptus oil were added to it, and it was re-submitted to agitation/aeration, producing a float which assayed 8.2% lead, 42.4% zinc, and 14-ozs. of silver per ton. The residue assayed 2% lead, 1.3% zinc and 2.8-ozs. of silver per ton. This test was carried out without acid.

(3) Four pounds of water were submitted to agitation at 80° F. and a solution of elemental sulfur containing three grains of sulfur was intermixed with it.

The sulfur solution was prepared by agitating five grams of powdered sulfur in boiling water, to which eight drops of eucalyptus oil and two drops of coal tar per pound of water, were added. In the flotation bath thus prepared, one pound of fresh slime from a Broken Hill calcitic ore was submitted to agitation/aeration, producing a float which assayed 56.3% lead and 10.1% zinc.

The remainder was heated to 160° F. and four drops of eucalyptus oil were added to it, and it was resubmitted to agitation/aeration, producing a float which assayed 8% lead and 45.1% zinc. The residue assayed 2.7% lead and 2.4% zinc. This test was carried out without acid.

(4) One drop of coal tar, six grains of sulfur and four drops of eucalyptus oil were boiled for five minutes in water, and the solution so made was agitated with four pounds of water at a temperature of 80° F. Then one pound of a fresh Broken Hill slime and four drops of eucalyptus oil were added to the solution, and the pulp so formed was subjected to agitation/aeration producing a float which assayed 61.2% lead, 9.6% zinc, and 35.4-ozs. of silver per ton. The temperature of the remainder was raised to 100° F. and a quantity of acid (equivalent to 40-lbs. per ton of slime) was added to it, and it was subjected to agitation/aeration, producing a float which assayed 7.4% lead, 48% zinc and 6.5-ozs. of silver per ton. The residue assayed 2.1% lead, 2.2% zinc and 1.6-ozs. of silver per ton.

(5) Two pounds of a Broken Hill weathered slime, five pounds of water, 30-cc. of sulfur solution (containing an equivalent of 1.2-lbs. of sulfur per ton of slime) and a quantity of sulfuric acid (equivalent to 8-lbs. per ton of slime), were subjected to agitation/aeration, producing a float which assayed 61.8% lead, 9.6% zinc and 33.6-ozs. of silver per ton.

The remainder was heated to 125° F. and a quantity of acid (equivalent to 30-pounds per ton of slime) was added to it, and it was subjected to agitation/aeration, producing a float which assayed 7.4% lead, 46.6% zinc and 13.1-ozs. of silver per ton. The residue assayed 4.5% lead (of which 3.7% was oxidized,) 2.8% zinc (of which 0.8% was oxidized), and 2.1-ozs. of silver per ton.

(6) A parcel of 1000-tons of Broken Hill weathered slime was treated in the plant at the rate of 20-tons per hour at the Junction North Broken Hill Mine, No-Liability, by agitation/aeration machines with a quantity of water which maintained the pulp at about 33% solids, and with a quantity of sulfur solution (containing about half a pound of sulfur per ton of slime), and with 30-pounds of sulfuric acid per ton of slime, at a temperature of 80° F. producing a float which assayed 61.1% lead, 10.1% zinc, and 40-ozs. of silver per ton.

The remainder was heated at 135° F. and 20 pounds of acid per ton of slime were added to it, and it was treated in agitation/aeration machines, producing a float which assayed 6.2% lead, 48.8% zinc and 9.6-ozs. of silver per ton. The residue assayed 5.2% lead (of which 4.7 was oxidized), 2.4% zinc (of which 1.2% was oxidized) and 1.9-ozs. of silver per ton.

(7) Two pounds of a weathered Broken Hill slime, five pounds of water, 20-cc. of sulfur solution (containing the equivalent of 0.8-lbs. of sulfur per ton of slime) and a quantity of acid (equivalent to 8-lbs. per ton of slime) were subjected to agitation/aeration at a temperature of 80° F., producing a float which assayed 59.8% lead, 11.0% zinc, and 32.4-ozs. of silver per ton.

The remainder was heated to 130° F. and a quantity of sulfuric acid (equivalent to 20-lbs. per ton of slime) was added to it, and it was subjected to agitation/aeration, producing a float which assayed 6.6% lead, 48.3% zinc, and 11.1-ozs. of silver per ton. The residue assayed 3.7% lead (of which 3% was oxidized), 2.8% zinc (of which 0.6% was oxidized), and 2.3-ozs. of silver per ton.

The sulfur solution was made by heating together sulfur and a weak aqueous solution of sulfuric acid and a little tar oil.

(8) One pound of a completely oxidized Broken Hill weathered slime, four pounds of water, 40-cc. of sulfur solution (containing the equivalent of 3.2-lbs. of sulfur per ton of slime,) were subjected to agitation/aeration with sulfureted hydrogen gas, producing a float which assayed 51.0% lead, 8.1% zinc, and 17.9-ozs. of silver per ton. The residue assayed 1.9% lead, 1.1% zinc and 1.2-ozs. of silver per ton.

The instances of representative treatments previously detailed disclose the fact that in procuring a differential float, the zinc sulfids are brought up in the secondary operation when the flotation mass is warmed or heated, without adding acid thereto, but in other cases the zinc sulfid has been induced to rise by adding acid and/or frothing agents and/or heating the mass.

What we claim as our invention and desire to secure by Letters Patent is:—

1. A process for the differential or preferential separation of mixed sulfids, in which the ores containing the same are subjected to a flotation treatment in an aqueous medium containing elemental sulfur dissolved in a solvent and added thereto in a proportion not in excess of one half of 1% of sulfur to ore, thereby to procure separation of one of such sulfids; and in which the ore remainder is subsequently resubmitted to flotation for the separation of another sulfid therefrom after adding a frothing agent to said medium.

2. A process for the differential or preferential separation of mixed sulfids, in which the ores containing the same are subjected to flotation treatment in an aqueous medium containing elemental sulfur added thereto in a proportion not in excess of one half of 1% of sulfur to ore, thereby to procure separation of one of such sulfids; and in which the ore remainder is subsequently resubmitted to flotation for the separation of another sulfid therefrom after adding acid to said medium.

3. A process for the differential or preferential separation of mixed sulfids, in which the ores containing the same are subjected to flotation treatment in an aqueous medium containing elemental sulfur dissolved in a solvent and added thereto in a proportion not in excess of one half of 1% of sulfur to ore, thereby to procure separation of one of such sulfids; and in which the ore remainder is subsequently resubmitted to flotation for the separation of another sulfid therefrom after adding a frothing agent and acid to said medium.

4. A process for the differential or preferential separation of mixed sulfids, in which the ores containing the same are subjected to flotation treatment in an aqueous medium containing elemental sulfur added thereto in a proportion not in excess of one half of 1% of sulfur to ore, thereby to procure separation of one of said sulfids; and in which the ore remainder is subsequently resubmitted to flotation for the separation of another sulfid therefrom after the temperature of said medium has been substantially raised.

5. A process for the differential or preferential separation of mixed sulfids, in which the ores containing the same are subjected to flotation treatment in an aqueous medium containing elemental sulfur added thereto in a proportion not in excess of one half on 1% of sulfur to ore, thereby to procure separation of one of said sulfids; and in which the ore remainder is subsequently resubmitted to flotation for the separation of another sulfid therefrom after adding a frothing agent to said medium and substantially raising the temperature of said medium.

6. A process for the differential or preferential separation of mixed sulfids, in which the ores containing the same are subjected to flotation in an aqueous medium containing elemental sulfur added thereto in a proportion not in excess of one half of 1% of sulfur to ore, thereby to procure separation of one of said sulfids; and in which the ore remainder is subsequently resubmitted to flotation in the same medium for the separation of another sulfid therefrom after adding acid to said medium and substantially raising the temperature of said medium.

7. A process for the differential or preferential separation of mixed sulfids, in which the ores containing the same are subjected to flotation treatment in an aqueous medium containing elemental sulfur added thereto in a proportion not in excess of one half of 1% of sulfur to ore, thereby to procure separation of one of said sulfids; and in which the ore remainder is subsequently resubmitted to flotation for the separation of another sulfid therefrom after adding a frothing agent and acid to said medium and substantially raising the temperature of said medium.

THOMAS HENRY PALMER.
HARRY VERNON SEALE.
RALPH DOWLING NEVETT.

Witnesses:
KEILA DILLON,
M. A. WILLIAMSON,
GEO. L. NEURST.